(12) United States Patent
Khouri

(10) Patent No.: US 6,423,768 B1
(45) Date of Patent: Jul. 23, 2002

(54) POLYMER-ORGANOCLAY COMPOSITE COMPOSITIONS, METHOD FOR MAKING AND ARTICLES THEREFROM

(75) Inventor: Farid Fouad Khouri, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/629,271

(22) Filed: Jul. 31, 2000

Related U.S. Application Data

(60) Provisional application No. 60/152,581, filed on Sep. 7, 1999.

(51) Int. Cl.[7] .............................. C08K 3/34; C08K 5/15
(52) U.S. Cl. ....................... 524/445; 524/114; 524/210; 524/321; 524/538
(58) Field of Search ................................ 527/114, 210, 527/321, 445, 538

(56) References Cited

U.S. PATENT DOCUMENTS

| | | | |
|---|---|---|---|
| 4,739,007 A | 4/1988 | Okada et al. ............... | 524/789 |
| 5,164,440 A | 11/1992 | Deguchi et al. ............ | 524/444 |
| 5,530,052 A | 6/1996 | Takekoshi et al. .......... | 524/447 |
| 5,691,411 A | 11/1997 | Khouri et al. ................ | 525/64 |
| 5,707,439 A | 1/1998 | Takekoshi et al. .......... | 106/483 |
| 5,770,644 A | 6/1998 | Yamamoto et al. ......... | 524/120 |
| 5,773,502 A | 6/1998 | Takekoshi et al. .......... | 524/411 |

FOREIGN PATENT DOCUMENTS

| | | |
|---|---|---|
| JP | 7324160 | 12/1995 |
| JP | H816190 | 2/1996 |
| WO | 09304118 | 3/1993 |

*Primary Examiner*—Kriellion A. Sanders
(74) *Attorney, Agent, or Firm*—Andrew J. Caruso; Noreen C. Johnson

(57) ABSTRACT

This invention relates to polymer-organoclay composite compositions comprising an thermoplastic organic polymer bearing amine groups, an organoclay containing quaternary ammonium ions incorporating at least two alkyl or cycloalkyl groups; and optionally one or more additional thermoplastic polymers, impact modifying agents and compatibilizing agents. The performance characteristics of the polymer-organoclay composite compositions are found to be closely linked to the structure of the ammonium cation present in the organoclay used. The compositions are suitable for use in the manufacture of molded articles.

27 Claims, No Drawings

POLYMER-ORGANOCLAY COMPOSITE COMPOSITIONS, METHOD FOR MAKING AND ARTICLES THEREFROM

RELATED APPLICATION

This application claims the benefit of U.S. Provisional Application No. 60,152,581, filed Sep. 7, 1999 the contents of which are hereby incorporated in its entirety by reference.

BACKGROUND OF THE INVENTION

This invention relates to novel polymer-organoclay composite compositions. More particularly, the instant invention relates to composite materials containing both organoclays and organic polymers bearing amine groups. The organoclays described by the instant invention are those that incorporate a secondary, tertiary or quaternary ammonium ion. Additional optional components of these composite materials are a second thermoplastic polymer, an impact modifying agent and a compatibilizing agent.

Materials in which an organoclay is highly and uniformly dispersed in a polymer matrix are prized for their greater resistance to the effects of heat compared to systems containing a clay component which is less highly dispersed. Resistance to heat induced deformation of a molded part prepared from polymeric materials is critical in applications where the part is to be painted and then subjected to a high heat baking step as is frequently the case in the automotive industry. Polymer-organoclay composite compositions, sometimes referred to as nanocomposites, having improved heat resistance have been prepared by combining a variety of materials including polyamides and polyphenylene ethers with organoclays, impact improving additives and compatibilizing agents. Although addition of an organoclay improves the heat resistance of a material, the presence of the organoclay may result in loss of molecular weight of one or more of the polymer components of the composition during extruding and molding steps. The effect of this loss of molecular weight of one or more of the polymer components has the effect that articles molded from the composition are less robust than they would be absent the loss of molecular weight. In other instances the organoclay may not exfoliate and disperse uniformly within the polymer matrix. In such cases the compositions do not exhibit the enhanced physical properties of nanocomposites where the physical properties of the composition are closely tied to the size and uniformity of dispersion of the organoclay particles. There is a continuing need to improve the overall performance characteristics of polymer-organoclay composite compositions as a function of the size of the organoclay particles, which is dependent upon the extent to which the organoclay particles exfoliate, the uniformity of dispersion of the organoclay particles within the composition and the chemical stability of the constituent polymers. Particularly, there is demand for improved performance characteristics among polymer-organoclay composite compositions comprising both polyamides and polyphenylene ethers. The instant invention is based on the discovery that certain organoclays may be employed as components of polymer-organoclay composite compositions which are not subject to these limitations.

BRIEF SUMMARY OF THE INVENTION

The present invention overcomes earlier limitations on the use of organoclays in polymer-organoclay composite compositions by adjustment of the structure of the ammonium ion in the organoclay component. These and further objects of the invention will be more readily appreciated when considering the following disclosure and appended claims.

In one aspect, the invention relates to polymer-organoclay composite compositions comprising:
(A) at least one organic thermoplastic polymer bearing amine groups;
(B) at least one organoclay comprising organic ammonium cations having structure I

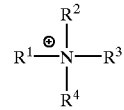

wherein each $R^1$, $R^2$, $R^3$ and $R^4$ is independently a hydrogen, $C_1$–$C_{18}$ alkyl group or a $C_3$–$C_{18}$ cycloalkyl group, wherein no more than two of the groups $R^1$, $R^2$, $R^3$ and $R^4$ are hydrogen; and wherein no more than one of the groups $R^1$, $R^2$, $R^3$ and $R^4$ is an alkyl group or cycloalkyl group having more than 10 carbon atoms;
or in the alternative having structure II

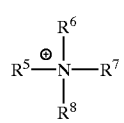

wherein $R^5$ is a $C_1$–$C_{18}$ alkyl group and $R^6$, $R^7$ and $R^8$ are hydrogen atoms or methyl groups wherein at least one of $R^6$, $R^7$ and $R^8$ is a methyl group;
said organoclay being present in an amount in a range between about 0.1 weight percent and about 40 weight percent, based on the total weight of components (A), (B), (C), (D) and (E);
(C) a thermoplastic resin different from component (A), said thermoplastic resin being present in an amount in a range between about 0.0 weight percent and about 90 weight percent, based on the combined total weight of components (A), (B), (C), (D) and (E);
(D) an impact modifying agent, said impact modifying agent being present in an amount in a range between about 0 weight percent and about 20 weight percent, based on the combined total weight of components (A), (B), (C), (D) and (E); and
(E) a compatibilizing agent in an amount in a range between about 0 weight percent and about 10 weight percent, based on the total weight of components (A), (B), (C), (D) and (E).

The invention further relates to methods of making these compositions and molded articles prepared from them.

DETAILED DESCRIPTION OF THE INVENTION

The present invention may be understood more readily by reference to the following detailed description of preferred embodiments of the invention and the examples included herein. In this specification and in the claims which follow, reference will be made to a number of terms which shall be defined to have the following meanings.

"Amine group" is herein defined as a primary or secondary amine group.

Component (A) is herein defined as at least one organic thermoplastic polymer bearing amine groups. An organic thermoplastic polymer bearing amine groups refers to a thermoplastic polymer comprising a plurality of polymer chains, at least some of said polymer chains bearing one or more primary or secondary amine groups. The amine groups may be located at the ends of the polymer chains or at other positions along the polymer backbone. An organic thermoplastic polymer bearing amine groups is exemplified by a polyamide such as a nylon 6,6 in which a majority of the polymer chains bear a primary amine group at each end of the polymer chain. There is no requirement that each polymer chain bear an amine group, however. In some instances a thermoplastic polymer bearing amine groups may be comprised of individual polymer chains bearing only a single amine group and polymer chains bearing no amine groups at all. As used herein the term "organic thermoplastic polymer" and the term "thermoplastic polymer" have the same meaning.

A "latent carbon-carbon double bond" is herein defined as an arrangement of atoms which affords a newly formed carbon-carbon double bond upon the occurrence of a carbon-carbon double bond-forming event such as an elimination reaction. The compound, 2-hydroxysuccinic acid exemplifies a molecule containing a latent carbon-carbon double bond.

The term "melt stability" of a polymer-organoclay composite composition as used herein refers to the resistance of one or more of the polymeric components of a polymer-organoclay composite composition to loss of molecular weight resulting from exposure of the material to temperatures required for extrusion, melt mixing, molding, drying, thermoforming or other heat treatment.

As used herein, the term "nylon nanocomposite" refers to a polymer-organoclay composite composition consisting essentially of a nylon and an organoclay.

"Organoclay" is herein defined as a layered silicate material comprising an organic ammonium cation.

The term "polymer-organoclay composite composition" as used herein refers to a composition comprising an organoclay and one or more polymeric components together with any additives such as compatibilizing agents, impact modifying agents, carbon powder, carbon fibers, carbon fibrils, carbon nanotubes, flame retardants, mold release agents and the like; and is used interchangeably with the terms "polymer-organoclay composition", and "polymer-organoclay materials".

The term "structural units" made in reference to polymers is used to designate the structure of repeat units within the polymer. In the case of polyphenylene ethers, structural units are understood to be derived from the monomer, or in the alternative the mixture of monomers, used in the preparation of the polyphenylene ether. A given polyphenylene ether, for example poly(2,6-dimethyl-1,4-phenylene-co-2,3,6-trimethyl-1,4-phenylene ether) (CAS Number 58295-79-7), contains structural units derived from 2,6-dimethylphenol and 2,3,6-trimethylphenol.

Component (A) of the polymer-organoclay compositions of the present invention is at least one organic thermoplastic polymer comprising amine groups or, in the alternative, component (A) is a blend of thermoplastic organic polymers at least one of which comprises amine groups. The amine groups may be primary amine groups or secondary amine groups. Polymers comprising component (A) are not limited to a particular class of polymers and may include any polymer in which at least some of the polymer chains comprise one or more amine groups. Component (A) may include polyamides, polycarbonates, copolyestercarbonates, polyesters, copolyesteramides, polysulfones, polyimides, polyetherimides such as ULTEM® polyetherimide (available from General Electric Plastics), silicone-copolyetherimide copolymers such as SILTEM® (available from General Electric Plastics), polysiloxanes or copolymers comprising styrene and acrylonitrile, for example SAN; which bear amine groups on at least some of the polymer chains and preferably upon 50 percent or more of the polymer chains constituting component (A). Where component (A) is a polyamide it is preferred that the amine group concentration of component (A) be in a range between about 30 microequivalents per gram ($\mu$eq/g) and about 120 $\mu$eq/g and still more preferred that the amine group concentration of component (A) be in a range between about 55 $\mu$eq/g and about 120 $\mu$eq/g. An amine group concentration in a range between about 100 $\mu$eq/g and about 120 $\mu$eq/g is particularly preferred. Polyamides possessing amine group concentrations over about 75 $\mu$eq/g are considered for the purposes of the present invention to constitute high amine endgroup polyamides. Where component (A) of the polymer-organoclay composite compositions of the present invention is an organic polymer other than a polyamide a similar pattern of amine group concentration preferences is applicable.

Polyamides comprising component (A) may be, but are not limited to, polyamides and copolyamides derived from polymerization of α-pyrrolidone, α-piperidone, caprolactam, 6-aminocaproic acid, 7-aminoheptanoic acid, 9-aminononanoic acid, 10-aminodecanoic acid, 11-aminoundecanoic acid and 1 2-aminododecanoic acid or mixtures thereof. Component (A) further includes polyamides and copolyamides obtained by polycondensation of a diamine selected from the group consisting of 1,3-diaminopropane, 1,4-diaminobutane, 1,5-diaminopentane, hexamethylenediamine, nonamethylenediamine, undecamethylenediamine, dodecamethylenediamine and mixtures thereof; with a diacid selected from the group consisting of succinic acid, adipic acid, nonanedioic acid, sebacic acid, dodecandioic acid, terephthalic acid, isophthalic acid and mixtures thereof. Component (A) additionally may be a blend of polyamides in which at least one of said polyamides comprises amine groups. Among the various polyamides within the scope of the present invention which may serve as component (A) nylon 4/6, nylon 6, nylon 6/6, nylon 6/9, nylon 6/10, nylon 6/12, nylon 11 and nylon 12 are preferred; and nylon 6 and nylon 6/6 are particularly preferred.

Component (B) is at least one organoclay obtained from a layered silicate mineral such as montmorillonite which has undergone cation exchange with an organic ammonium cation. The organoclay may be prepared from a variety of layered silicate materials such as bentonite, a clay mineral comprised chiefly of montmorillonite, or other smectite clays such as the beidellites, saponites and hectorites. This cation exchange process may be carried out by dispersing the inorganic form of the clay in a suitable medium such as water and adding an organic ammonium salt to the mixture and stirring the mixture at a temperature in a range between about 25° C. and about 100° C. The exchange process affords a slurry of the organoclay in water from which the organoclay may be isolated by filtration and dried before use.

In one aspect, the present invention provides polymer-organoclay composite compositions the performance characteristics of which are dependent upon the structure of the organic ammonium cation present in the organoclay. It has been found that polymer-organoclay compositions may show a high level of component polymer degradation, or poor dispersion of the organoclay in the polymer matrix, or a defect in one of the physical properties of the composition such as glass transition temperature (Tg) or the coefficient of thermal expansion (CTE), and that these deficiencies are surprisingly linked to the structure of the organic ammonium cation present in the organoclay. The instant invention provides polymer-organoclay compositions in which the polymer matrix is not degraded by the presence of the organoclay, the organoclay is highly dispersed in the polymer matrix and the organoclay does not adversely affect the physical properties of components of the polymer-organoclay composition such as the glass transition temperature. Moreover, the coefficient of thermal expansion (CTE) of the polymer-organoclay composite compositions of the present invention is enhanced relative to CTEs of polymer-organoclay composite compositions falling outside the scope of this invention. The instant invention provides a means for controlling these and other parameters as demonstrated herein.

Component (C) is a thermoplastic resin which is different from component (A) or, in the alternative, component (C) is a blend of two or more thermoplastic resins each of which is different from component (A). Component (C) includes, but is not limited to, polyamides, polyesters, copolyesteramides, polycarbonates, copolyestercarbonates, polyimides, polyetherimides, polyolefins, polysiloxanes, silicone-polyetherimide copolymers, copolymers comprising styrene and acrylonitrile such as SAN, polysulfones and polyphenylene ethers. Compositions in which component (C) comprises a polyphenylene ether are preferred. Preferred polyphenylene ethers comprise poly(2,6-dimethyl-1,4-phenylene ether), poly(2,3,6-trimethyl-1,4-phenylene ether), poly(3-benzyl-2,6-dimethyl-1,4-phenylene ether), poly(2,6-diethyl-1,4-phenylene ether), poly(2-methyl-6-ethyl-1,4-phenylene ether), poly(2-methyl-6-isobutyl-1,4-phenylene ether), poly(2,6-diisopropyl-1,4-phenylene ether), poly(3-bromo-2,6-dimethyl-1,4-phenylene ether), poly(2-methyl-6-phenyl-1,4-phenylene ether), poly(2,6-diphenyl-1,4-phenylene ether) and copolyphenylene ethers such as poly(2,6-dimethyl-1,4-phenylene-co-2,3,6-trimethyl-1,4-phenylene ether) incorporating two or more of the structural units found in the homopolyphenylene ethers listed above.

When component (C) is a polyphenylene ether and component (A) is at least one polyamide, it is preferred that components (A) and (C) exist as separate phases in the polymer-organoclay composition and that component (A) be the continuous phase and that component (C) be dispersed within the continuous phase. The instant invention provides compositions in which the Tg-lowering effect of organoclay on the glass transition temperature of component (C) dispersed within the continuous phase (component (A)) is reduced relative to polymer-organoclay compositions falling outside the scope of this invention.

Component (D) is an impact modifying agent which is added to improve the impact resistance of molded articles prepared from the compositions of the present invention. Suitable impact modifying agents for the purposes of the present invention include, but are not limited to, commercially available impact modifying agents, such as Kraton® rubber impact modifiers available from Shell Chemicals. Additionally, polymeric materials prepared from styrene, ethylene, and maleic acid or maleic anhydride; polymeric materials prepared from ethylene and unsaturated carboxylic acids and their metal salts; polymeric materials prepared from olefins containing acid groups; block copolymers prepared from vinylaromatic monomers, such as styrene and alpha-methyl styrene, conjugated dienes, such as butadiene and cyclopentadiene, and unsaturated carboxylic acids and anhydrides; block copolymers prepared from vinylaromatic monomers, such as styrene and alpha-methyl styrene, olefins such as propylene, conjugated dienes, such as butadiene and cyclopentadiene, and unsaturated carboxylic acids and anhydrides may be employed. Examples of other suitable impact modifying agents are styrene-butadiene random and block copolymers, styrene-ethylene-propylene terpolymers, styrene-propylene-styrene block copolymers, styrene-butadiene-styrene block copolymers, partially hydrogenated styrene-butadiene-styrene block copolymers, fully hydrogenated styrene-butadiene-styrene block copolymers and the like.

Component (E) is a compatibilizing agent the purpose of which is to promote copolymer formation between components (A) and (C). Where components (A) and (C) are immiscible or only partially miscible in one another, formation of at least some copolymer derived from components (A) and (C) favorably affects the size and distribution of the domains constituted principally by the discontinuous component in the continuous phase. It is generally preferred that particles of the discontinuous phase be uniformly distributed throughout the continuous phase. Where component (A) is a polyamide and component (C) is a polyphenylene ether, insufficient copolymer formation typically results in a greater level of phase separation between the polymeric components. When a higher level of copolymer formation is achieved, a more uniform distribution of the polyphenylene ether particles (the discontinuous phase) within the polyamide continuous phase is obtained. In the instant invention it has been found that an amount of compatibilizing agent in the range between about 0.25 percent by weight and about 10 percent by weight based on the total weight of components (A), (B), (C), (D) and (E) is effective to achieve a composition in which component (C) as the discontinuous phase is uniformly dispersed within component (A) as the continuous phase. Dispersion of the discontinuous phase is, for the purposes of the present invention, considered uniform when the particles of the discontinuous phase range in size between about 0.01 and about 2 microns in diameter.

Component (E) includes but is not limited to dicarboxylic acids, tricarboxylic acids and cyclic carboxylic acid anhydrides wherein said dicarboxylic acids, tricarboxylic acids and cyclic carboxylic acid anhydrides contain at least one carbon-carbon double bond, carbon-carbon triple bond or a latent carbon-carbon double bond. Examples of dicarboxylic acids and their anhydride derivatives which may be used include maleic acid, fumaric acid, itaconic acid, 2-hydroxysuccinic acid, citric acid, 2-butynedioic acid, maleic anhydride, 2-hydroxysuccinic anhydride and citraconic anhydride. Among the forgoing examples the five membered ring cyclic anhydrides and citric acid are preferred. Maleic anhydride and citric acid are particularly preferred. Component (E) further includes multifunctional epoxides, ortho esters, oxazolidines and isocyanates; capable of reacting with both component (A) and component (C).

In one embodiment, the present invention provides polymer-organoclay composite compositions comprising components (A), (B), (C), (D) and (E) wherein component (B) is an organoclay comprising organic ammonium cations having structure II wherein $R^5$ is a $C_1$–$C_{18}$ alkyl group and $R^6$, $R^7$ and $R^8$ are hydrogen atoms or methyl groups wherein at least one of $R^6$, $R^7$ and $R^8$ is a methyl group. Suitable organic ammonium cations represented by structure II are illustrated by, but not limited to decylmethylammonium, methylundecylammonium, dodecylmethylammonium, methyltridecylammonium, methyltetradecylammonium, methylpentadecylammonium, hexadecylmethylammonium,

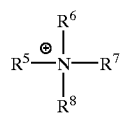

heptadecylmethylammonium methyloctadecylammonium, decyldimethylammonium, dimethylundecylammonium, dimethyldodecylammonium, dimethyltridecylammonium, dimethyltetradecylammonium, dimethylpentadecylammonium, dimethylhexadecylammonium, dimethylheptadecylammonium, dimethyloctadecylammonium, decyltrimethyl-ammonium, trimethylundecylammonium, dodecyltrimethylammonium, tridecyltrimethylammonium, tetradecyltrimethylammonium, pentadecyltrimethylammonium, hexadecyltrimethylammonium, heptadecyltrimethylammonium and octadecyltrimethylammonium cations.

The instant invention provides polymer-organoclay compositions in which component (A) constitutes from about 10 percent to about 99.9 percent by weight of the composition based on the total weight of components (A), (B), (C), (D) and (E). Component (C) constitutes from about 0 percent to about 90 percent by weight of the composition based on the total weight of components (A), (B), (C), (D) and (E).

Where component (A) is a polyamide and component (C) is a polyphenylene ether, compositions in which the amount of component (A) is in a range between about 30 percent and about 90 percent of the total weight of components (A), (B), (C), (D) and (E); and the amount of component (C) is in a range between about 10 percent and about 70 percent of the total weight of components (A), (B), (C), (D) and (E) are preferred. Compositions in which the amount of component (A) is in a range between about 40 percent and about 70 percent of the total weight of components (A), (B), (C), (D) and (E); and the amount of component (C) is in a range between about 30 percent and about 60 percent of the total weight of components (A), (B), (C), (D) and (E) are particularly preferred.

Component (B) is present in an amount in a range between about 0.1 percent and about 40 percent based upon the total weight of components (A), (B), (C), (D) and (E). Compositions in which component (B) is present in an amount in a range between about 1 percent and about 10 percent based on the total weight of components (A), (B), (C), (D) and (E) are preferred. Where component (A) is a polyamide and component (C) is a polyphenylene ether, compositions incorporating component (B) in an amount in a range between about 2 percent and about 8 percent based on the total weight of components (A), (B), (C), (D) and (E) are preferred. Where component (A) is a polyamide and component (C) is a polyphenylene ether, compositions incorporating an amount of component (B) in a range between about 3 percent and about 7 percent based on the total weight of components (A), (B), (C), (D) and (E) are particularly preferred.

Component (D) may be present in an amount sufficient to improve the impact resistance of articles molded from the compositions of the present invention compared to molded articles prepared from compositions not containing component (D). Typically, articles made from the compositions of the present invention have impact resistance suitable for use in automotive applications, businsess machine housing applications and the like. It has been found that the addition of an amount of impact modifying component (D) in a range of from about 2 percent to about 40 percent based on the total amount of components (A), (C) and (D) is preferred. An amount of component (D) in a range between about 5 percent and about 15 percent based on the total weight of components (A), (B), (C), (D) and (E) is particularly preferred.

Component (E) may be present in an amount in a range between about 0 percent and about 10 percent by weight based on the total weight of components (A), (B), (C), (D) and (E). Where component (A) is a polyamide and component (C) is a polyphenylene ether, component (E) is present in an amount preferably in a range between about 0.25 percent and about 8 percent by weight based on the total weight of components (A), (B), (C), (D) and (E); and even more preferably in a range between about 0.4 percent and about 2 percent by weight based on the total weight of components (A), (B), (C), (D) and (E).

The polymer-organoclay composite compositions of the present invention may optionally be blended with any conventional additives used in various applications such as the preparation of molded articles for use in the automotive industry. Said conventional additives include but are not limited to flame retardants, UV absorbers, antioxidants, heat stabilizers, anti static agents and mold release agents, slip agents, antiblocking agents, lubricants, anticlouding agents, coloring agents, natural oils, synthetic oils, waxes, inorganic fillers and mixtures thereof.

In particular, it is preferable to form a blend of the polymer-organoclay composite composition and additives which may aid in processing the blend to form the desired molded article such as an automotive body panel. The blend may optionally comprise from about 0.0001 to about 10% by weight of the desired additives, more preferably from about 0.0001 to about 1.0% by weight of the desired additives.

Examples of the aforementioned flame retardants include but are not limited to polymeric or non-polymeric organic phosphorus species selected from the group consisting of phosphoramidates, phosphate esters, thiophosphate esters, phosphonate esters, thiophosphonate esters, phosphinate esters, thiophosphinate esters, phosphines, including triphenylphosphine, phosphine oxides, including triphenylphosphine oxide and tris(2-cyanoethyl)phosphine oxide, thiophosphine oxides, and phosphonium salts. Preferred organic phosphorus species are non-polymeric phosphate esters including, for example, alkyl phosphate esters, aryl phosphate esters, resorcinol-based phosphate esters, and bisphenol-based phosphate esters. Illustrative, non-limiting examples of such phosphorus species include triphenylphosphate, tricresylphosphate, resorcinol bis (diphenyl-phosphate), bisphenol A bis(diphenyl-phosphate), and other aromatic phosphate esters known in the art.

Further examples of flame retardants useful as additives in the compositions of the present invention comprise at least one polymeric or non-polymeric inorganic phosphorus salt with anions selected from the group consisting of phosphates, thiophosphates, phosphonates, thiophosphonates, phosphinates, thiophosphinates, pyrophosphates, and metaphosphates. The cations in these inorganic phosphorus salts comprise at least one cation selected from the group consisting of ammonium, alkyl-substituted ammonium, aryl-substituted ammonium, and mixed alkyl-aryl-substituted ammonium; alkali metal, lithium, sodium, potassium; alkaline earth metal, magnesium, calcium, barium; transition metal, zirconium, hafnium, iron, zinc; lanthanide metal, lanthanum; boron; aluminum; and tin. Preferred inorganic phosphorus species are non-polymeric phosphate salts including, for example, alkali metal phosphates, boron phosphate, aluminum phosphate, and zinc phosphate.

Further examples of flame retardants useful as additives in the compositions of the present invention comprise polymeric or non-polymeric sulfur species selected from the group consisting of sulfonate salts, sulfinate salts, sulfones, sulfoxides, and sulfides. Illustrative, non-limiting examples of such polymeric or non-polymeric sulfur species include polyarylene sulfide, polyarylene sulfide-sulfones, and salts of sulfonated aromatic compounds. Preferred sulfur species are polyphenylene sulfide, polyphenylsulfone, sodium paratoluene sulfonate, potassium diphenylsulfone-3-sulfonate, and Reimer's salts, including potassium perfluorobutane sulfonate.

Further examples of flame retardants useful as additives in the compositions of the present invention comprise boron-containing species. Illustrative, non-limiting examples of such species include zinc borate, boron phosphate, borax, and boric acid. Zinc borate is a particularly preferred boron-containing species.

Further examples of flame retardants useful as additives in the compositions of the present invention comprise polymeric or non-polymeric antimony compounds selected from the group consisting of oxides, halides, sulfides, sulfonates, phosphates, phosphonates, and carboxylates. Illustrative, non-limiting examples of such polymeric or non-polymeric antimony compounds include antimony oxide, antimony trichloride, and antimony potassium tartrate. A particularly preferred antimony compound is antimony oxide.

Still further examples of flame retardants useful as additives in the compositions of the present invention comprise polymeric or non-polymeric silicone compounds. Polymeric silicone compounds may be preferred. Polymeric silicone compounds, called polysiloxanes, are those containing a plurality of dimethylsiloxane units, and, optionally, a minor proportion of organic groups, including but not limited to, at least one of vinyl, hydrogen, epoxy, amine, phenyl, trifluoropropyl and the like. For certain embodiments suitable polymeric silicone compounds include SF1706 and SF1708 available from General Electric Silicones.

Examples of the aforementioned heat stabilizers, include, but are not limited to, phenol stabilizers, organic thioether stabilizers, organic phosphite stabilizers, hindered amine stabilizers, epoxy stabilizers and mixtures thereof. The heat stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers and mixtures thereof.

Examples of the mold release agents include, but are not limited to natural and synthetic paraffins, polyethylene waxes, fluorocarbons, and other hydrocarbon mold release agents; stearic acid, hydroxystearic acid, and other higher fatty acids, hydroxy fatty acids, and other fatty acid mold release agents; stearic acid amide, ethylenebisstearamide, and other fatty acid amides, alkylenebisfatty acid amides, and other fatty acid amide mold release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acids, polyhydric alcohol esters of fatty acids, polyglycol esters of fatty acids, and other fatty acid ester mold release agents; silicone oil and other silicone mold release agents, and mixtures of any of the aforementioned.

Coloring agents may be either pigments or dyes. Organic and inorganic coloring agents may be used separately or in combination in the invention.

In addition to conventional additives, the polymer-organoclay composite compositions of the present invention may be blended with additives such as carbon powder, carbon fibers, carbon fibrils, carbon nanotubes and mixtures thereof; which may enhance the electrical conductivity and electromagnetic shielding properties of the polymer-organoclay composite composition. Polymer-organoclay composite compositions containing carbon powder, carbon fibers, carbon fibrils or carbon nanotubes are materials which when molded provide articles which are particularly well suited for use in applications where the article is to be subjected to electrostatic painting as in automotive and computer housing applications.

The polymer-organoclay composite compositions of the present invention may prepared using melt processing techniques. Typically, melt processing involves subjecting the components of the polymer-organoclay composite composition to intimate mixing at a temperature in a range between about 400 degrees Fahrenheit (° F.) and about 600° F. Melt processing in an extruder is preferred. Three methods of preparing the polymer-organoclay composite compositions of the present invention are particularly preferred.

Method 1:

In one of its particularly preferred embodiments the present invention provides a polymer-organoclay composite composition by extruding a mixture comprising components (A) and (B) at temperatures ranging from about 400° F. to about 600° F. to provide an extrudate. The extrudate comprising components (A) and (B) is herein referred to as the (A)+(B) extrudate. The (A)+(B) extrudate is coextruded with components (C), (D) and (E), or in the alternative with a mixture comprising components (C), (D) and (E), to afford a polymer-organoclay composite composition comprising components (A), (B), (C), (D) and (E). The mixture comprising components (A) and (B) may contain one or more of the components (C), (D) or (E). Generally, it is preferred that the mixture comprising components (A) and (B) consist essentially of components (A) and (B). The mixture comprising components (A) and (B) may, however, contain additives such as flame retardants, UV stabilizers, mold release agents, carbon powder, carbon fibers, carbon fibrils, carbon nanotubes or mixtures thereof, and the like. Where a mixture comprising components (C), (D) and (E) is employed said mixture may contain additional amounts of either or both of components (A) and (B) but generally it is preferred that the mixture comprising components (C), (D) and (E) consist essentially of components (C), (D) and (E) together with any additives such as flame retardants, UV stabilizers, mold release agents, carbon powder, carbon fibers, carbon fibrils, carbon nanotubes or mixtures thereof, and the like. When the mixture of components (A) and (B) is extruded, it is preferable that there be at least one vacuum vented zone in the extruder. Coextruding the (A)+(B) extrudate with components (C), (D) and (E) may be carried out as follows: the (A)+(B) extrudate and a mixture comprising components (C), (D) and (E) are dry blended and charged to the feed inlet of an extruder and mixed and heated at temperatures ranging from about 400° F. to about 600° F. In some instances, as in the case where a the (A)+(B) extrudate contains a relatively high level of the organoclay, component (A) may be added to the mixture comprising components (C), (D) and (E). During this coextrusion step it is frequently desirable to vent at least one zone of the extruder. The zone may be vented at atmospheric pressure or adapted for a vacuum venting.

In one aspect of Method 1 the (A)+(B) extrudate is coextruded with components (C), (D) and (E), or one or more mixtures comprising one or more of the components (C), (D) and (E). In such instances the individual components (C), (D) and (E), or mixtures comprising one or more of the components (C), (D) and (E) may be introduced at one or more feed inlets of the extruder, said feed inlets being the same as or different from that used to introduce the (A)+(B) extrudate into the extruder.

Method 2:

In a second particularly preferred method for preparing the polymer-organoclay compositions of the present invention a mixture comprising components (C), (D) and (E) is extruded to provide an extrudate. The extrudate comprising components (C), (D) and (E) is then coextruded at temperatures ranging from about 400° F. to about 600° F. with the extrudate comprising components (A) and (B) prepared in Method 1 to provide a polymer-organoclay composite composition comprising components (A), (B), (C), (D) and (E).

Method 3:

The present invention provides a third particularly preferred method for making polymer-organoclay composite compositions, said method comprising extruding a mixture comprising components (A), (C), (D) and (E) to provide an extrudate, and coextruding the extrudate comprising (A), (C), (D) and (E) with component (B), or in the alternative with a mixture comprising component (B), to afford a polymer-organoclay composite composition comprising components (A), (B), (C), (D) and (E). In one aspect Method 3 provides a polymer-organoclay composition in a single extrusion step by introducing components (A), (C), (D) and (E) or, in the alternative, mixtures comprising one or more of components (A), (C), (D) and (E), into one or more feed inlets of an extruder. The heated zones and die of the extruder are maintained at temperatures between about 400° F. and about 600° F. Component (B) or, in the alternative, a mixture comprising component (B), is introduced at a feed inlet of the extruder closer to the die than the feed inlet or inlets used to introduce components (A), (C), (D) and (E). The product strand emerging from the extruder is a polymer-organoclay composite composition comprising components (A), (B), (C), (D) and (E). In the practice of Method 3 it is preferable that at least one zone of the extruder be vacuum vented.

A mixture comprising component (B) is any mixture of component (B) with one or more of components (A), (C), (D) or (E), together with any additional additives such as a flame retardants, antioxidants, mold release agents, carbon powder, carbon fibers, carbon fibrils, carbon nanotubes and the like. In addition, a mixture comprising component (B) may refer to component (B) alone in combination with one or more additives, such as a flame retardants, antioxidants, mold release agents, carbon powder, carbon fibers, carbon fibrils, carbon nanotubes and the like. In general, a mixture comprising one or more of components (A), (B), (C), (D) or (E) may comprise additives, such as a flame retardants, antioxidants, mold release agents, carbon powder, carbon fibers, carbon fibrils, carbon nanotubes and the like.

Articles made from the compositions of the present invention may be obtained by forming the polymer-organoclay composite composition by such means as injection molding, compression molding and extrusion methods. Injection molding is the more preferred method of forming the article. Among the molded articles which may be prepared from the compositions of the present invention are automotive articles such as automotive body panels, fenders and the like; and computer housings and the like.

EXAMPLES

The following examples are put forth so as to provide those of ordinary skill in the art a detailed description of how the compositions of matter and methods embraced by the invention are made and evaluated. The examples are intended to be illustrative of specific embodiments of the present invention rather than as limits upon the scope of the invention. Unless otherwise indicated, parts are by weight, temperature is in degrees centigrade (° C.) and is at or near room temperature and pressure is at or near atmospheric.

Molecular weights were determined as weight average ($M_w$) and were determined by gel permeation chromatography using polystyrene standards.

Melt stability of polymer-organoclay composite compositions comprising nylon 6/6 was determined by comparison of the weight average molecular weight ($M_w$) of the virgin nylon used in the preparation of the polymer-organoclay composite composition with the $M_w$ of the nylon fraction of the polymer-organoclay composite composition which had been subjected to at least one extrusion step.

Tg and modulus values were determined by dynamic mechanical analysis (DMA) using molded Izod test bars having dimensions: length=2.5 inches, width=0.5 inches and thickness=0.125 inches. Measurements of Tg and modulus were made between 25 and 300° C. Modulus values are reported at 125° C.

Coefficients of thermal expansion (CTE's) were determined on 3.2 millimeter (mm) square test samples cut from the center of injection molded tensile bars. The samples were polished with 400 grit sandpaper to ensure smooth parallel surfaces. A Perkin Elmer TMA-7 was employed using the following temperature program. The test samples at 23° C. were heated at 10° C. per minute to 150° C. and held at that temperature for 30 minutes to anneal them. The test samples were then cooled to −50° C. at 20° C. per minute and held at −50° C. for 10 minutes. The temperature was then raised from −50° C. to 150° C. at 5° C. per minute and the CTE of the sample was measured. Measurements were made in the "flow" direction, parallel to the length of the tensile bar from which the test samples were cut.

Example 1

Sodium montmorillonite clay (400 grams (g), Kunipia-F available from Kunimime Industry, Japan, cation exchange capacity 119 milliequivalents/100 grams, 11% water content, 0.42 mole sodium ion) was added to 20 liters of deionized water in a 75 liter Henschel mixer and mixed initially at low speed for about thirty seconds and then at high speed for about 10 minutes. As the sodium montmorillonite suspension was vigorously mixed, a solution of dodecyltrimethylammonium bromide (130.62 g, 0.42 mole) in 1000 milliliters (mL) deionized H2O/methanol (MeOH) mixture (1:1 volume:volume) was added via a funnel through an opening at the top of the Henschel mixer. The mixture was stirred at high speed for about 10 to15 minutes and then drained into a holding barrel. A total of four batches were prepared using this procedure and the crude product mixtures were combined in the same holding barrel. The combined product mixtures were allowed to stand overnight at ambient temperature and the product organoclay isolated by centrifugation. The foamy product mixture was centrifuged through a 5 micron cloth bag and the resulting cake was spray washed with deionized water while being centrifuged. The wet cake was divided in two portions and each was resuspended in deionized water/MeOH (1:1 volume:volume 25 liters) in a Henschel mixer and stirred for about 5 to 10 minutes at low speed. The combined deionized water/MeOH treated material was again centrifuged and the cake was thoroughly spray washed with deionized water and centrifuged further for 1 hour. The somewhat moist solid product was broken into smaller pieces, placed in trays and dried in a vacuum oven at a temperature from about 100 to about 110° C. under a continuous flow of nitrogen for 48 hours. The final dried product was then ground in a high speed Retsch grinder to afford the exchanged organoclay, trimethyidodecylammonium montmorillonite, having a particle size of 0.5 millimeters (mm) or less.

Example 2

To dimethyldodecylamine (113 g, 0.53 mole) in a deionized water/MeOH mix (900 mL, 1:1 volume:volume) was added concentrated HCl (52.25 gram) and the mixture was stirred until all of the dimethyidodecylamine dissolved and a homogeneous solution of the amine hydrochloride was obtained. This solution was added with vigorous mixing to a suspension of sodium montmorillonite clay (500 grams, 119 milliequivalents/100 grams, 11% water content, 0.53 mole sodium ion) in deionized water (25 liters) contained in a 75 liter Henschel mixer. The mixture was then stirred at high speed for about 12 to 15 minutes and the product organoclay was then isolated, dried and ground as described in Example 1 to afford dimethyidodecylammonium montmorillonite having a particle size of 0.5 mm or less.

The organoclays used in comparative examples 1 and 2 containing the dodecylammonium cation were prepared analogously from dodecylamine.

Examples 3–13

Polymer-organoclay composite compositions comprising components (A) and (B) in the absence of components (C), (D) and (E) were prepared as follows: A blend of dry, ground polyamide and the desired amount of organoclay was extruded on a twin screw extruder the zone temperatures of which were set at 500° F., 525° F. and 4×565° F. and a die temperature of 565° F. The extruder was operated at 350 rpm and the material feed was maintained at such a rate to keep the torque below 7 amps. Vacuum was applied at zone 5 to remove volatiles. The resulting strand was cooled in a water bath and pelletized. The pellets were dried in an air circulating oven at 120° C. for 4 hours and then allowed to cool in a sealed glass jar before use. Additionally, the polymer-organoclay composite compositions comprising components (A) and (B) in the absence of components (C), (D) and (E) served as feedstocks for the preparation of compositions comprising all of the components (A), (B), (C), (D) and (E).

Feedstock compositions, referred to here as "polyphenylene ether masterbatches", comprising polyphenylene ether (PPE) (component (C)), impact modifier (component (D)) and compatibilizing agent (component (E)) were prepared as follows: A dry blend of PPE resin (637 g) having an intrinsic viscosity of about 0.46 deciliters per gram (dl/g) in chloroform at 25° C., an impact modifier (130 g, Kraton® G 1701, a styrene-ethylene-propylene terpolymer (SEP)) and a compatibilizing agent (citric acid (7.8 g) or maleic anhydride (5.2 g)) was mixed in a Henschel mixer and then extruded on a 20 mm counter-rotating twin screw extruder operating at 400 rpm at a torque less than 7 amps. Zone temperatures were set at 450° F., 550° F, and 4×575° F. and the die temperature was set at 575° F. The extruder had an open atmospheric vent at zone 5. The strands were cooled in water, pelletized and allowed to cool in air at room temperature overnight.

Polymer-organoclay composite compositions comprising components (A),(B),(C),(D) and (E) in which component (A) is a polyamide and component (C) is a polyphenylene ether were prepared as follows: A dry blend of a nylon 6/6 nanocomposite and a polyphenylene ether masterbatch was extruded on a 20 mm counter-rotating twin screw extruder operating at 400 rpm at a torque of less than 7 amps. Zone temperatures were set at 450° F., 550° F., and 4×575° F. and the die temperature was set at 575° F. A vacuum was applied at zone 5. The pelletized polymer-organoclay composite composition comprising components (A),(B),(C),(D) and (E) was dried at 120° C. for 4 hours in an air circulating oven and then allowed to cool in a sealed glass jar before use. Test parts were molded on a 30 ton molding machine. Comparative examples 1–17 were prepared using the methods employed in the preparation of the working examples of the invention or, in the alternative, were commercially available. Comparative examples incorporating the dimethyidioctadecylammonium cation, $(C_{18})_2NMe_2^+$, were prepared using a commercially available cation exchanged montmorillonite organoclay, Clayton HY, available from Southern Clay Products, Gonzales, Tex.

In one aspect the present invention provides polymer-organoclay composite compositions comprising a polyamide and an organoclay having improved melt stability relative to known polyamide-organoclay compositions. Table 1 illustrates the effect of ammonium cation structure on the melt stability of compositions comprising a polyamide and an organoclay. Melt stability is gauged by comparison of the weight average molecular weight ($M_w$) of the virgin nylon 6/6 used in the preparation of the "nylon nanocomposite" with the $M_w$ of the nylon fraction of the composition formed upon extrusion of the nylon 6/6 with the organoclay. A value of the "Nylon $M_w$ Ratio" of less than 0.9 indicates loss of nylon molecular weight during the extrusion step. Comparative Examples 1 and 2 are shown to be less melt stable than the compositions of the present invention exemplified by examples 3, 4 and 5.

TABLE 1

MELT STABILITY OF NYLON 6/6 IN NYLON NANOCOMPOSITES: EFFECT OF AMMONIUM ION STRUCTURE.

| Example[a] | Cation | Type[c] | Clay Loading (Wt % of Nylon) | Nylon $M_w$ Ratio (Composite/Virgin) |
|---|---|---|---|---|
| CE[b]-1 | $C_{12}NH_3^+$ | 1° | 5 | 0.67 |
| CE[b]-2 | $C_{12}NH_3^+$ | 1° | 10 | 0.5 |
| 3 | $C_{12}NHMe_2^+$ | 3° | 4.93 | 1.08 |
| 4 | $C_{12}NHMe_2^+$ | 3° | 11.83 | 1.05 |
| 5 | $C_{12}NMe_3^+$ | 4° | 12 | 1.09 |
| CE[b]-3 | $(C_{18})_2NMe_2^+$ | 4° | 12 | 0.94 |

[a]All Compositions prepared by extrusion of a blend of Nylon 6/6 with an ammonium montmorillonite clay comprising the organic ammonium cation indicated.
[b]Comparative Example.
[c]Cation type: 1° = primary ammonium, 3° = tertiary ammonium, 4° = quaternary ammonium.

In one aspect the present invention provides a polymer-organoclay composite composition comprising nylon 6/6 and an organoclay, said polymer-organoclay composite composition having a reduced coefficient of thermal expansion (CTE). Although the invention is not dependent upon theory, it is believed that the reduction of the coefficient of thermal expansion correlates with more complete dispersion of the organoclay in the nylon. Nylon-organoclay composite compositions were examined by transmission electron microscopy (TEM) and the degree to which the organoclay had dispersed in the nylon was assessed. The dispersion of the organoclay component of nylon-organoclay compositions was considered to be incomplete when the TEM micrograph revealed the presence of multiple elongated multilayer organoclay particles (tactoids) having an interlayer distance between clay layers of about 20 angstroms or less. In contrast, dispersion of the organoclay was considered to be complete when the TEM micrograph revealed the absence of multiple tactoids having an interlayer distance between clay layers of about 20 angstroms or less and instead revealed a much more uniform distribution of the organoclay within the polymer matrix and, where tactoids were observed, the interlayer distance between clay layers was greater than about 50 angstroms. The data in Table 2 demonstrate that the degree to which the organoclay disperses in the nylon matrix is dependent upon the structure of the ammonium cation present in the organoclay. The amount of clay used in each of the compositions shown was adjusted such that the composition contained the same weight of the inorganic aluminosilicate portion of the clay. Surprisingly, the organoclay incorporating the dimethyldioctadecylammonium cation (($C_{18}$)$_2$NMe$_2^+$) failed to exfoliate and incomplete dispersion of the organoclay resulted. This stands in sharp contrast to Examples 6 and 7 which incorporate structurally different ammonium cations, the dodecyltrimethylammonium cation ($C_{12}$NMe$_3^+$) and the dimethyidodecyl-ammonium cation ($C_{12}$NHMe$_2^+$) respectively, in which complete organoclay dispersion was observed and with it substantial reduction in the CTE. Additionally, when the dispersion of the organoclay in the nylon matrix was complete the material exhibited greater stiffness as judged by its higher modulus value (E).

TABLE 2

EFFECT OF CATION STRUCTURE
ON ORGANOCLAY DISPERSION IN NYLON 6/6

| Example[a] | Cation Structure | % Clay[b] | Degree of Dispersion[c] | E[d] | % CTE Reduction[e] |
|---|---|---|---|---|---|
| CE[f]-4 | ($C_{18}$)$_2$NMe$_2^{+[g]}$ | 6.4 | incomplete | 2.63 | 10 |
| 6 | $C_{12}$NMe$_3^+$ | 5.0 | complete | 3.65 | 47 |

TABLE 2-continued

EFFECT OF CATION STRUCTURE
ON ORGANOCLAY DISPERSION IN NYLON 6/6

| Example[a] | Cation Structure | % Clay[b] | Degree of Dispersion[c] | E[d] | % CTE Reduction[e] |
|---|---|---|---|---|---|
| 7 | $C_{12}$NHMe$_2^+$ | 4.9 | complete | 3.36 | 36 |
| CE[h]-5 | — | — | — | 1.83 | 0 |

[a]All Compositions prepared by extrusion of a blend of nylon 6/6 with an ammonium montmorillonite clay having the cation structure indicated.
[b]Weight percent organoclay adjusted to provide equal amounts of the inorganic clay component.
[c]Determined by transmission electron microscopy (TEM)
[d]Modulus in dynes/cm$^2$ × 10$^9$ measured at 125° C.
[e]Reduction in the coefficient of thermal expansion (CTE) relative to a nylon 6/6.
[f]Comparative example.
[g]Commercially available as Clayton HY.
[h]Comparative example: nylon 6/6 without added organoclay.

In a further aspect the present invention provides polymer-organoclay composite compositions comprising as component (A) nylon 6/6 bearing amine end groups, as component (B) an organoclay, as component (C) poly(2,6-dimethyl-1,4-phenylene ether), as component (D) Kraton® G 1701, and as component (E) a compatibilizing agent consisting of either maleic anhydride or citric acid. Compositions prepared for evaluation are gathered in Table 3 and data on the physical properties of these compositions are given in Table 4. The data in Table 4 reveal a striking and unexpected dependence of the physical properties of polymer-organoclay composite compositions upon the structure of the ammonium cation in the organoclay used. The data in Table 4 illustrate that those compositions comprising the dimethyldioctadecylammonium cation, comparative examples 10 and 11 (CE-10 and CE-1 1), were inferior to the compositions of the present invention as reflected in the lower notched Izod impact test values, the lower tensile elongation values and the lower percent reduction in coefficient of thermal expansion observed for comparative examples 10 and 11 relative to Examples 8–12.

TABLE 3

EXAMPLES AND COMPARATIVE EXAMPLES:
POLYMER-ORGANOCLAY COMPOSITE COMPOSITIONS COMPRISING
NYLON 6/6 AND POLY(2,6-DIMETHYL-1,4-PHENYLENE ETHER).

| Example[a] | pts(A)[b] | [NH$_2$][c] | pts(B)[d] | Cation[e] | pts(C) | pts(D) | pts(E) |
|---|---|---|---|---|---|---|---|
| CE-6 | 41 | 110 | 0 | | 49 | 10 | 0.6[f] |
| CE-7 | 41 | 110 | 0 | | 49 | 10 | 0.4[g] |
| CE-8 | 41 | 55 | 0 | | 49 | 10 | 0.4[g] |
| CE-9 | 41 | 55 | 0 | | 49 | 10 | 0.6[f] |
| 8 | 41 | 55 | 4.92 | $C_{12}$NMe$_3^+$ | 49 | 10 | 0.6[f] |
| CE-10 | 41 | 55 | 4.92 | ($C_{18}$)$_2$NMe$_2^+$ | 49 | 10 | 0.6[f] |
| 9 | 41 | 55 | 4.84 | $C_{12}$NHMe$_2^+$ | 49 | 10 | 0.6[f] |
| 10 | 41 | 55 | 4.84 | $C_{12}$NHMe$_2^+$ | 49 | 10 | 0.4[g] |
| 11 | 41 | 110 | 4.84 | $C_{12}$NHMe$_2^+$ | 49 | 10 | 0.6[f] |
| 12 | 41 | 110 | 4.84 | $C_{12}$NHMe$_2^+$ | 49 | 10 | 0.4[g] |
| CE-11 | 41 | 55 | 4.92 | ($C_{18}$)$_2$NMe$_2^+$ | 49 | 10 | 0.4[g] |

[a]Comparative examples 6–9 (CE-6 through CE-9) contain no organoclay.
[b]Component (A) is selected from one of two grades of nylon 6/6 having amine group concentrations of about 110 μeq/g and about 55 μeq/g respectively.
[c]Amine group concentration in μeq/g.
[d]pts() indicates the weight expressed as parts of the indicated component.
[e]Organoclay cation.
[f]Citric acid.
[g]Maleic anhydride.

Comparative Examples 6–9 (CE-6 through CE-9) are provided to illustrate the effect of component (A) amine group concentration and the identity and concentration of component (E) on the physical properties of compositions comprising components (A), (C), (D) and (E) but lacking component (B). Additionally, the data illustrate improved performance in polymer-organoclay composite compositions comprising nylons having a higher concentration of amine groups.

TABLE 5

EFFECT OF ORGANOCLAY CATION STRUCTURE ON PPE GLASS TRANSITION TEMPERATURE.

| Example[a] | pts(A)[b] | pts(B)[c] | Cation[d] | pts(C)[e] | pts(D) | pts(E) | Tg[h] |
|---|---|---|---|---|---|---|---|
| CE-12 | 41 | | | 49 | 0.6[f] | 10 | 218 |
| 13 | 41 | 4.92 | $C_{12}NMe_3^+$ | 49 | 0.6[f] | 10 | 214 |
| CE-13 | 41 | 4.92 | $(C_{18})_2NMe_2^+$ | 49 | 0.6[f] | 10 | 200 |
| CE-14 | 41 | 4.92 | $(C_{18})_2NMe_2^+$ | 49 | 0.4[g] | 10 | 203 |
| CE-15 | 0 | 0 | — | 100 | 0 | 0 | 213 |
| CE-16 | 0 | 5.0 | $C_{12}NMe_3^+$ | 100 | 0 | 0 | 212 |
| CE-17 | 0 | 6.39 | $(C_{18})_2NMe_2^+$ | 100 | 0 | 0 | 200 |

[a]Example and comparative examples (CE)
[b]Component (A) is nylon 6/6 having an amine group concentrations of about 55 μeq/g
[c]pts() indicates the weight expressed as parts of the indicated component.
[d]Organoclay cation.
[e]Component (C) is poly(2,6-dimethyl-1,4-phenylene ether).
[f]Citric acid.
[g]Maleic anhydride.
[h]Glass transition temperature in °C.

TABLE 4

PHYSICAL PROPERTIES OF POLYMER-ORGANOCLAY COMPOSITE COMPOSITIONS COMPRISING NYLON 6/6 AND POLY(2,6-DIMETHYL-1,4-PHENYLENE)ETHER AND COMPARATIVE EXAMPLES.

| Example[a] | RT-NI[b] | LT-NI[c] | TE[d] | % CTE Reduction[e] | PPE Particle size[f] |
|---|---|---|---|---|---|
| CE-6 | 12.0 | 8.40 | 159 | | |
| CE-7 | 9.60 | 2.20 | 133 | | |
| CE-8 | 9.60 | 3.30 | 83 | | |
| CE-9 | 9.50 | | 50 | | 0.69 |
| 8 | 0.47 | | 3.9 | 30 | 0.72 |
| CE-10 | 0.15 | | 2.1 | 9 | 0.66 |
| 9 | 0.33 | | 7.4 | 37 | 2.73 |
| 10 | 0.54 | 0.40 | 5.8 | 30 | 2.2 |
| 11 | 1.98 | 0.72 | 26 | 30 | 0.82 |
| 12 | 2.20 | 1.00 | 26 | 28 | 0.59 |
| CE-11 | 0.18 | | 2.6 | | |

[a]Compositions of the indicated examples and comparative examples are given in Table 3.
[b]Room temperature notched Izod impact test value in foot-pounds per inch (ft.lb/in).
[c]Notched Izod impact test value, test run at −20° C.
[d]Tensile elongation test value (% elongation of test specimen)
[e]Percent reduction in coefficient of thermal expansion (CTE) relative to a control composition lacking clay.
[f]PPE particle size in microns.

Table 5 further illustrates the dependence of the physical properties of polymer-organoclay composite compositions upon the structure of the ammonium cation of the organoclay used in its preparation. In Table 5 compositions containing nylon 6/6; an organoclay, poly(2,6-dimethyl-1,4-phenylene ether), Kraton® G 1701 impact modifier, and maleic anhydride or citric acid as a compatibilizing agent are presented together with data which illustrate the effect of ammonium cation structure upon the glass transition temperature of the polyphenylene ether component of the composition. Comparative Examples 13 and 14 show a reduction in the glass transition temperature relative to the compositions of the present invention as illustrated by Example 13. Because the glass transition temperature is closely tied to the heat resistance characteristics of a material such as heat distortion temperature, it is highly desirable that the organoclay additive not reduce the glass transition temperature of the polyphenylene ether component of compositions comprising organoclays and polyphenylene ethers such as those described by the present invention. Here the structure of the ammonium cation present in the organoclay affects the glass transition temperature of the polyphenylene ether phase of the polymer-organoclay composite composition.

The invention has been described in detail with particular reference to preferred embodiments thereof, but it will be understood by those skilled in the art that variations and modifications can be effected within the spirit and scope of the invention.

What is claimed is:

1. A polymer-organoclay composite composition comprising:

(A) at least one polyamide bearing amine groups;

(B) at least one organoclay comprising organic ammonium cations having structure I

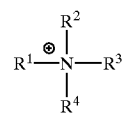

wherein each $R^1$, $R^2$, $R^3$ and $R^4$ is independently a hydrogen, $C_1$–$C_{18}$ alkyl group or a $C_3$–$C_{18}$ cycloalkyl group, wherein no more than two of the groups $R^1$, $R^2$, $R^3$ and $R^4$ are hydrogen; and wherein no more than one of the groups $R^1$, $R^2$, $R^3$ and $R^4$ is an alkyl group or cycloalkyl group having more than 10 carbon atoms;

or in the alternative having structure II

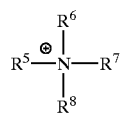

wherein $R^5$ is a $C_1$–$C_{18}$ alkyl group and $R^6$, $R^7$ and $R^8$ are hydrogen atoms or methyl groups wherein at least one of $R^6$, $R^7$ and $R^8$ is a methyl group;

said organoclay being present in an amount in a range between about 0.1 weight percent and about 40 weight percent, based on the total weight of components (A), (B), (C), (D) and (E);

(C) a polyphenylene ether, said polyphenylene ether being present in an amount in a range between about 0.0 weight percent and about 90 weight percent, based on the combined total weight of components (A), (B), (C), (D) and (E);

(D) an impact modifying agent, said impact modifying agent being present in an amount in a range between about 0 weight percent and about 20 weight percent, based on the combined total weight of components (A), (B), (C), (D) and (E); and (E) a compatibilizing agent in an amount in a range between about 0 weight percent and about 10 weight percent, based on the total weight of components (A), (B), (C), (D) and E).

2. A polymer-organoclay composite composition according to claim 1 wherein the compatibilizing agent is selected from the group comprising multifunctional epoxides, ortho esters, oxazolidines and isocyanates; a dicarboxylic acid, a tricarboxylic acid and a cyclic carboxylic acid anhydride, wherein each said dicarboxylic acid, tricarboxylic acid and cyclic carboxylic acid anhydride comprises at least one carbon-carbon double bond, carbon-carbon triple bond or latent carbon-carbon double bond.

3. A polymer-organoclay composite composition according to claim 1 wherein said polyamide is derived from at least one of α-pyrrolidone, α-piperidone, caprolactam, 6-aminocaproic acid, 7-aminoheptanoic acid, 9-aminononaoic acid, 10-aminodecanoic acid, 11-aminoundecanoic acid and 12-aminododecanoic acid or mixtures thereof.

4. A polymer-organoclay composite composition according to claim 1 wherein said polyamide and is obtained by polycondensation of a diamine selected from the group consisting of 1,3-diaminopropane, 1,4-diaminobutane, 1,5-diaminopentane, hexamethylenediamine, nonamethylenediamine, undecamethylenediamine, dodecamethylenediamine and mixtures thereof; with an acid selected from the group consisting of succinic acid, adipic acid, nonanedioic acid, sebacic acid, dodecandioic acid, terephthalic acid, isophthalic acid and mixtures thereof.

5. A polymer-organoclay composite composition according to claim 1 wherein said polyamide is nylon 4/6, nylon 6, nylon 6/6, nylon 6/9, nylon 6/10, nylon 6/12, nylon 11 or nylon 12.

6. A polymer-organoclay composite composition according to claim 1 in which component (C) is a polyphenylene ether (PPE) selected from the group consisting of poly(2,6-dimethyl-1,4-phenylene ether), poly(2,3,6-trimethyl-1,4-phenylene ether), poly(3-benzyl-2,6-dimethyl-1,4-phenylene ether), poly(2,6-diethyl-1,4-phenylene ether), poly(2-methyl-6-ethyl-1,4-phenylene ether), poly(2-methyl-6-isobutyl-1,4-phenylene ether), poly(2,6-diisopropyl-1,4-phenylene ether), poly(3-bromo-2,6-dimethyl-1,4-phenylene ether), poly(2-methyl-6-phenyl-1,4-phenylene ether), and polyphenylene ethers incorporating two or more of the structural units found in the polyphenylene ethers listed above.

7. A polymer-organoclay composite composition according to claim 1 wherein component (B) is at least one organoclay comprising organic ammonium cations having structure II wherein $R^5$ is a $C_1$–$C_{18}$ alkyl

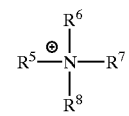

group and $R^6$, $R^7$ and $R^8$ are hydrogen atoms or methyl groups wherein at least one of $R^6$, $R^7$ and $R^8$ is a methyl group.

8. A polymer-organoclay composite composition according to claim 7 wherein the organic ammonium cation of component (B) is selected from the group consisting of decylmethylammonium, methylundecylammonium, dodecylmethylammonium, methyltridecylammonium, methyltetradecylammonium, methylpentadecylammonium, hexadecylmethylammonium, heptadecylmethylammonium, methyloctadecylammonium, decyidimethylammonium, dimethylundecylammonium, dimethyldodecylammonium, dimethyltridecylammonium, dimethyltetradecylammonium, dimethylpentadecylammonium, dimethylhexadecylammonium, dimethylheptadecylammonium, dimethyloctadecylammonium, decyltrimethylammonium, trimethylundecylammonium, dodecyltrimethylammonium, tridecyltrimethylammonium, tetradecyltrimethylammonium, pentadecyltrimethylammonium, hexadecyltrimethylammonium, heptadecyltrimethylammonium and octadecyltrimethylammonium cations.

9. A polymer-organoclay composite composition comprising:

(A) a blend of two or more polyamides at least one of which bears amine groups;

(B) at least one organoclay comprising organic ammonium cations having structure I

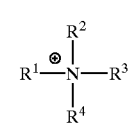

wherein each $R^1$, $R^2$, $R^3$ and $R^4$ is independently a hydrogen, $C_1$–$C_{18}$ alkyl group or a $C_3$–$C_{18}$ cycloalkyl group, wherein no more than two of the groups $R^1$, $R^2$, $R^3$ and $R^4$ are hydrogen; and wherein no more than one of the groups $R^1$, $R^2$, $R^3$ and $R^4$ is an alkyl group or cycloalkyl group having more than 10 carbon atoms; said organoclay being present in an amount in a range between about 0.1 and about 40 weight percent, based on the total the total weight of components (A), (B), (C), (D) and (E);

(C) a polyphenylene ether, said polyphenylene ether being present in an amount in a range between about 0.0 and about 90 weight percent, based on the combined total weight of components (A), (B), (C), (D) and (E);

(D) an impact modifying agent, said impact modifying agent being present in an amount in a range between about 0 and about 20 weight percent, based on the combined total weight of components (A), (B), (C), (D) and (E); and (E) a compatibilizing agent selected from the group comprising multifunctional epoxides, ortho esters, oxazolidines and isocyanates; a dicarboxylic acid, a tricarboxylic acid and a cyclic carboxylic acid anhydride, wherein each said dicarboxylic acid, tricarboxylic acid and cyclic carboxylic acid anhydride comprises at least one carbon-carbon double bond, carbon-carbon triple bond or latent carbon-carbon double bond; said compatibilizing agent being present in an amount in a range between about 0 and about 10 weight percent, based on the total weight of components (A), (B), (C), (D) and (E).

10. A polymer-organoclay composition according to claim 9 in which the polyamides are at least one of nylon 4/6, nylon 6, nylon 6/6, nylon 6/9, nylon 6/10, nylon 6/12, nylon 11 or nylon 12.

11. A polymer-organoclay composition according to claim 9 in which component (C) is a polyphenylene ether selected from the group consisting of poly(2,6-dimethyl-1,4-phenylene ether), poly(2,3,6-trimethyl-1,4phenylene ether), poly(3-benzyl-2,6-dimethyl-1,4-phenylene ether), poly(2,6-diethyl-1,4-phenylene ether), poly(2-methyl-6-ethyl-1,4-phenylene ether), poly(2-methyl-6-isobutyl-1,4-phenylene ether), poly(2,6-diisopropyl-1,4-phenylene ether), poly(3-bromo-2,6-dimethyl-1,4-phenylene ether), poly(2-methyl-6-phenyl-1,4-phenylene ether), and polyphenylene ethers incorporating two or more of the structural units found in the polyphenylene ethers listed above.

12. A method for making polymer-organoclay composite compositions comprising:

(A) at least one polyamide bearing amine groups;

(B) at least one organoclay comprising organic ammonium cations having structure I

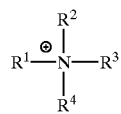

I wherein each $R^1$, $R^2$, $R^3$ and $R^4$ is independently a hydrogen, $C_1$–$C_{18}$ alkyl group or a $C_3$–$C_{18}$ cycloalkyl group, wherein no more than two of the groups $R^1$, $R^2$, $R^3$ and $R^4$ are hydrogen; and wherein no more than one of the groups $R^1$, $R^2$, $R^3$ and $R^4$ is an alkyl group or cycloalkyl group having more than 10 carbon atoms; said organoclay being present in an amount in a range between about 0.1 weight percent and about 40 weight percent, based on the total weight of components (A), (B), (C), (D) and (E);

(C) a polyphenylene ether, said polyphenylene ether being present in an amount in a range between about 0.0 weight percent and about 90 weight percent, based on the combined total weight of components (A), (B), (C), (D) and (E);

(D) an impact modifying agent, said impact modifying agent being present in an amount in a range between about 0 weight percent and about 20 weight percent, based on the combined total weight of components (A), (B), (C), (D) and (E); and (E) a compatibilizing agent selected from the group comprising multifunctional epoxides, ortho esters, oxazolidines and isocyanates; a dicarboxylic acid, a tricarboxylic acid and a cyclic carboxylic acid anhydride, wherein each said dicarboxylic acid, tricarboxylic acid and cyclic carboxylic acid anhydride comprises at least one carbon-carbon double bond, carbon-carbon triple bond or latent carbon-carbon double bond; said compatibilizing agent being present in an amount in a range between about 0 weight percent and about 10 weight percent, based on the total weight of components (A), (B), (C), (D) and (E);

said method comprising mixing components (A), (B), (C), (D), and (E) under melt processing conditions.

13. A method according to claim 12 wherein the melt processing conditions comprise:

(i.) extruding a mixture comprising components (A) and (B) to provide an extrudate; and (ii.) coextruding the (A)+(B) extrudate with components (C), (D) and (E) to afford a polymer-organoclay composite composition comprising components (A), (B), (C), (D) and (E).

14. A method according to claim 12 wherein the melt processing conditions comprise:

(i.) extruding a mixture comprising components (A) and (B) to provide an extrudate;

(ii.) extruding a mixture comprising components (C), (D) and (E) to provide an extrudate; and (iii.) coextruding the extrudate comprising components (C), (D) and (E) with the extrudate comprising components (A) and (B) to provide a polymer-organoclay composite composition comprising components (A), (B), (C), (D) and (E).

15. A method according to claim 12 wherein the melt processing conditions comprise:

(i.) extruding a mixture comprising components (A), (C), (D) and (E) to provide a extrudate; and (ii.) coextruding the extrudate comprising (A), (C), (D) and (E) with component (B) to provide a polymer-organoclay composite composition comprising components (A), (B), (C), (D) and (E).

16. A method according to claim 12 wherein the melt processing conditions comprise:

(i.) extruding a mixture comprising components (A), (C), (D) and (E) to provide an extrudate; and (ii.) coextruding the extrudate comprising (A), (C), (D) and (E) with a mixture comprising component (B) to afford a polymer-organoclay composite composition comprising components (A), (B), (C), (D) and (E).

17. A molded article prepared from a polymer-organoclay composite composition comprising:

(A) at least one polyamide bearing amine groups;

(B) at least one organoclay comprising organic ammonium cations having structure I

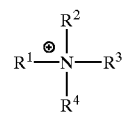

I wherein each $R^1$, $R^2$, $R^3$ and $R^4$ is independently a hydrogen, $C_1$–$C_{18}$ alkyl group or a $C_3$–$C_{18}$ cycloalkyl group, wherein no more than two of the groups $R^1$, $R^2$, $R^3$ and $R^4$ are hydrogen; and wherein no more than one of the groups $R^1$, $R^2$, $R^3$ and $R^4$ is an alkyl group or cycloalkyl group having more than 10 carbon atoms;

or in the alternative having structure II

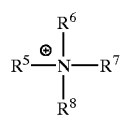

wherein $R^5$ is a $C_1$–$C_{18}$ alkyl group and $R^6$, $R^7$ and $R^8$ are hydrogen atoms or methyl groups wherein at least one of $R^6$, $R^7$ and $R^8$ is a methyl group;

said organoclay being present in an amount in a range between about 0.1 weight percent and about 40 weight percent, based on the total weight of components (A), (B), (C), (D) and (E);

(C) a polyphenylene ether, said polyphenylene ether being present in an amount in a range between about 0.0 weight percent and about 90 weight percent, based on the combined total weight of components (A), (B), (C), (D) and (E);

(D) an impact modifying agent, said impact modifying agent being present in an amount in a range between about 0 weight percent and about 20 weight percent, based on the combined total weight of components (A), (B), (C), (D) and (E); and a compatibilizing agent in an amount in a range between about 0 weight percent and about 10 weight percent, based on the total weight of components (A), (B), (C), (D) and (E).

18. A molded article according to claim 17 which is an automotive component.

19. A molded article according to claim 18 which is an automotive body panel.

20. A polymer-organoclay composite composition comprising:

(A) at least one polyamide with an amine group concentration between about 55 µeq/g and about 120 µeq/g, said polyamide being present in an amount in a range between about 40 weight percent and about 60 weight percent based upon the total weight of components (A),(B),(C),(D) and (E), said polyamide being selected from the group consisting of nylon 6 and nylon 6/6;

(B) at least one organoclay comprising organic ammonium cations selected from the group consisting of decylmethylammonium, methylundecylammonium, dodecylmethylammonium, methyltridecylammonium, methyltetradecylammonium, methylpentadecylammonium, hexadecylmethylammonium, heptadecylmethylammonium methyloctadecylammonium, decyidimethylammonium, dimethylundecylammonium, dimethyidodecylammonium, dimethyltridecylammonium, dimethyltetradecylammonium, dimethylpentadecylammonium, dimethylhexadecylammonium, dimethylheptadecylammonium, dimethyloctadecylammonium, decyltrimethylammonium, trimethylundecylammonium, dodecyltrimethylammonium, tridecyltrimethylammonium, tetradecyltrimethylammonium, pentadecyltrimethylammonium, hexadecyltrimethylammonium, heptadecyltrimethylammonium and octadecyltrimethylammonium cations; said organoclay being present in an amount in a range between about 4 weight percent and about 7 weight percent based upon the total weight of components (A), (B), (C), (D) and (E);

(C) at least one polyphenylene ether in an amount in a range between about 60 weight percent and about 40 weight percent based upon the total weight of components (A), (B), (C), (D) and (E); wherein said polyphenylene ether is poly(2,6-dimethyl-1,4-phenylene ether) or poly(2,6-dimethyl-co-2,3,6-trimethyl-1,4-phenylene ether);

(D) at least one impact modifying agent in an amount in the range between about 8 weight percent and about 12 weight percent based upon the total weight of components (A), (B), (C), (D) and (E); wherein said impact modifying agent is a styrene-ethylene-propylene terpolymer; and (E) at least one compatibilizing agent in an amount in a range between about 0.4 weight percent and about 0.6 weight percent based upon the total weight of components (A), (B), (C), (D) and (E); wherein said compatibilizing agent is citric acid or maleic anhydride.

21. A polymer-organoclay composite composition comprising:

(A) a nylon 6/6 having an amine group concentration between about 100 µeq/g and about 120 µeq/g, wherein the amount of nylon 6/6 is about 40 weight percent based upon the total weight of components (A), (B), (C), (D) and (E);

(B) an organoclay comprising organic ammonium cations selected from the group consisting of dodecylmethylammonium, dimethyidodecylammonium and dodecyltrimethylammonium cations, the amount of said organoclay being between about 4 weight percent and about 7 weight percent based upon the total weight of components (A), (B), (C), (D) and (E);

(C) a poly(2,6-dimethyl-1,4-phenylene ether) in an amount equivalent to about 50 weight percent of the total weight of components (A), (B), (C), (D) and (E);

(D) an impact modifying styrene-ethylene-propylene terpolymer in an amount equivalent to about 10 percent of the total weight of components (A), (B), (C), (D) and (E); and (E) a compatibilizing agent in an amount in a range between about 0.4 and 0.6 weight percent based upon the total weight of components (A), (B), (C), (D) and (E), wherein said compatibilizing agent is citric acid or maleic anhydride.

22. A method of making a polymer-organoclay composite composition comprising:

(A) a nylon 6/6 having an amine group concentration between about 100 µeq/g and about 120 µeq/g, wherein the amount of nylon 6/6 is about 40 weight percent based upon the total weight of components (A), (B), (C), (D) and (E);

(B) an organoclay comprising organic ammonium cations selected from the group consisting of dodecylmethylammonium, dimethyldodecylammonium and dodecyltrimethylammonium cations, the amount of said organoclay being between about 4 weight percent and about 7 weight percent based upon the total weight of components (A), (B), (C), (D) and (E);

(C) a poly(2,6-dimethyl-1,4-phenylene ether) in an amount equivalent to about 50 weight percent of the total weight of components (A), (B), (C), (D) and (E);

(D) an impact modifying styrene-ethylene-propylene terpolymer in an amount equivalent to about 10 percent of the total weight of components (A), (B), (C), (D) and (E); and (E) a compatibilizing agent in an amount in a range between about 0.4 and 0.6 weight percent based upon the total weight of components (A), (B), (C), (D) and (E), wherein said compatibilizing agent is citric acid or maleic anhydride;

said method comprising mixing components (A), (B), (C), (D) and (E) under melt processing conditions.

23. A method according to claim 22 wherein the melt processing conditions comprise:

(i.) extruding a mixture comprising components (A) and (B) to provide an extrudate; and (ii.) coextruding the (A)+(B) extrudate with components (C), (D) and (E) to afford a polymer-organoclay composite composition comprising components (A), (B), (C), (D) and (E).

24. A method according to claim 22 wherein the melt processing conditions comprise:

(i.) extruding a mixture comprising components (A) and (B) to provide an extrudate;

(ii.) extruding a mixture comprising components (C), (D) and (E) to provide an extrudate; and (iii.) coextruding the extrudate comprising components (C), (D) and (E) with the extrudate comprising components (A) and (B) to provide a polymer-organoclay composite composition comprising components (A), (B), (C), (D) and (E).

25. A method according to claim 22 wherein the melt processing conditions comprise:

(i.) extruding a mixture comprising components (A), (C), (D) and (E) to provide an extrudate; and (ii.) coextruding the extrudate comprising (A), (C), (D) and (E) with component (B) to provide a polymer-organoclay composite composition comprising components (A), (B), (C), (D) and (E).

26. A method according to claim 22 wherein the melt processing conditions comprise:

(i.) extruding a mixture comprising components (A), (C), (D) and (E) to provide an extrudate; and (ii.) coextruding the extrudate comprising (A), (C), (D) and (E) with a mixture comprising component (B) to afford a polymer-organoclay composite composition comprising components (A), (B), (C), (D) and (E).

27. A molded article prepared from a polymer-organoclay composite composition comprising:

(A) a nylon 6/6 having an amine group concentration between about 100 $\mu$eq/g and about 120 $\mu$eq/g, wherein the amount of nylon 6/6 is about 40 weight percent based upon the total weight of components (A), (B), (C), (D) and (E);

(B) an organoclay comprising organic ammonium cations selected from the group consisting of dodecylmethylammonium, dimethyldodecylammonium and dodecyltrimethylammonium cations, the amount of said organoclay being between about 4 weight percent and about 7 weight percent based upon the total weight of components (A), (B), (C), (D) and (E);

(C) a poly(2,6-dimethyl-1,4-phenylene ether) in an amount equivalent to about 50 weight percent of the total weight of components (A), (B), (C), (D) and (E);

(D) an impact modifying styrene-ethylene-propylene terpolymer in an amount equivalent to about 10 percent of the total weight of components (A), (B), (C), (D) and (E); and (E) a compatibilizing agent in an amount in a range between about 0.4 and 0.6 weight percent based upon the total weight of components (A), (B), (C), (D) and (E), wherein said compatibilizing agent is citric acid or maleic anhydride.

* * * * *